(12) United States Patent
Yashima

(10) Patent No.: US 12,544,848 B2
(45) Date of Patent: Feb. 10, 2026

(54) GAS SHIELD ARC WELDING METHOD AND METHOD FOR MANUFACTURING STEEL PIPE

(71) Applicant: Kabushiki Kaisha Kobe Seiko Sho (Kobe Steel, Ltd.), Kobe (JP)

(72) Inventor: Takashi Yashima, Fujisawa (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 806 days.

(21) Appl. No.: 17/759,418

(22) PCT Filed: Mar. 22, 2021

(86) PCT No.: PCT/JP2021/011709
§ 371 (c)(1),
(2) Date: Jul. 25, 2022

(87) PCT Pub. No.: WO2021/205858
PCT Pub. Date: Oct. 14, 2021

(65) Prior Publication Data
US 2023/0081560 A1 Mar. 16, 2023

(30) Foreign Application Priority Data
Apr. 10, 2020 (JP) .................................. 2020-071284

(51) Int. Cl.
*B23K 9/028* (2006.01)
(52) U.S. Cl.
CPC .................................. *B23K 9/0282* (2013.01)

(58) Field of Classification Search
CPC .... B23K 9/0282; B23K 9/028; B23K 9/0286; B23K 9/173; B23K 37/0217; B23K 2101/04; B23K 2103/04
See application file for complete search history.

(56) References Cited

FOREIGN PATENT DOCUMENTS

| CN | 103846528 A | 6/2014 |
| JP | 6-328245 A | 11/1994 |
| JP | 9-234562 A | 9/1997 |
| JP | 2005-95915 A | 4/2005 |
| JP | 2018-53626 A | 4/2018 |

(Continued)

OTHER PUBLICATIONS

Machine translation of Xie (CN 103846528), performed on May 21, 2025 (Year: 2014).*

(Continued)

*Primary Examiner* — Brian W Jennison
(74) *Attorney, Agent, or Firm* — Oblon, McClelland, Maier & Neustadt, L.L.P.

(57) ABSTRACT

A gas shield arc welding method that reduces the number of joints, which are the sites where defects occur more readily, and that enables automatic welding with a welding robot. A gas shield arc welding method in which a steel pipe Wo is welded by multi-pass welding with a steel frame erection adjusting tool attached to an erection piece on the steel pipe Wo to immobilize an open end section of the steel pipe. An initial single or several layers are welded to the open end section, after welding, the steel frame erection adjusting tool is removed; and remaining layers are welded with a welding robot such that two bead joints are formed at no more than two sites.

12 Claims, 11 Drawing Sheets

(56) References Cited

FOREIGN PATENT DOCUMENTS

JP            2019-155409 A      9/2019

OTHER PUBLICATIONS

Machine translation of Imanaga (JP 2005095915), performed on May 21, 2025 (Year: 2005).*
Machine translation of Umezu (JP 2018023626), performed on May 21, 2025 (Year: 2018).*
International Search Report issued May 18, 2021, in PCT/JP2021/011709, filed on Mar. 22, 2021, 2 pages.

* cited by examiner

FIG. 7
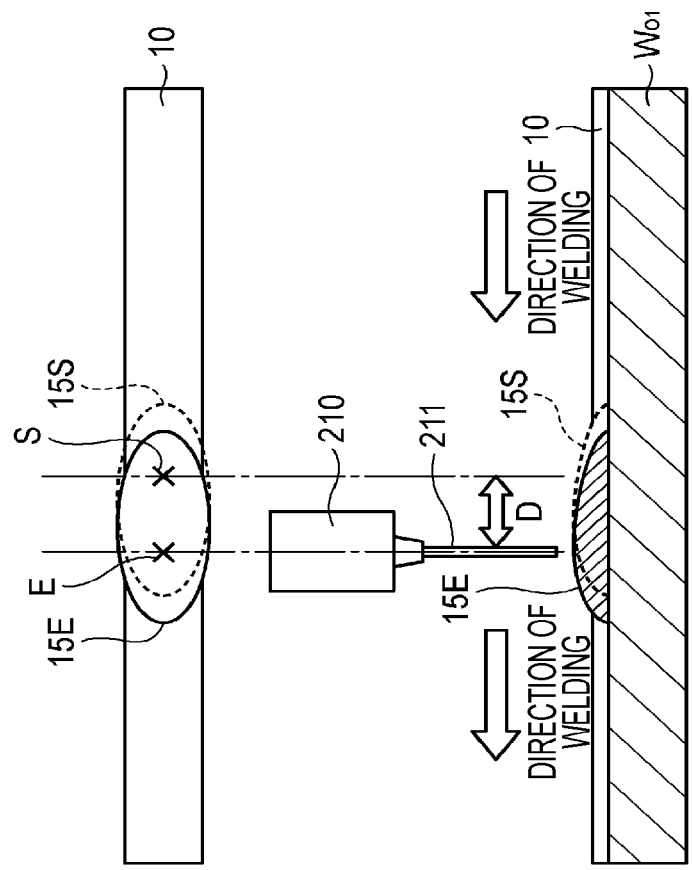
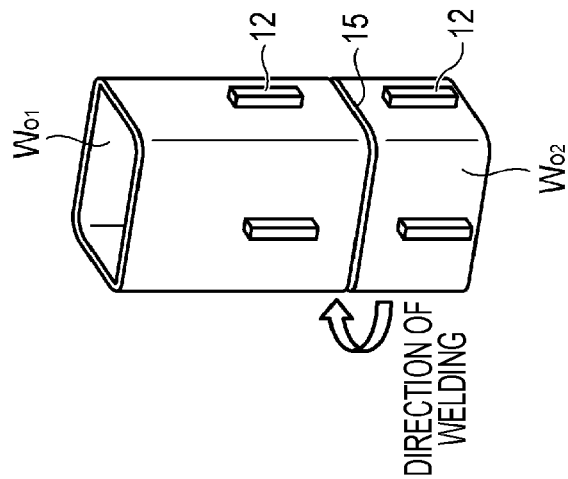

FIG. 9
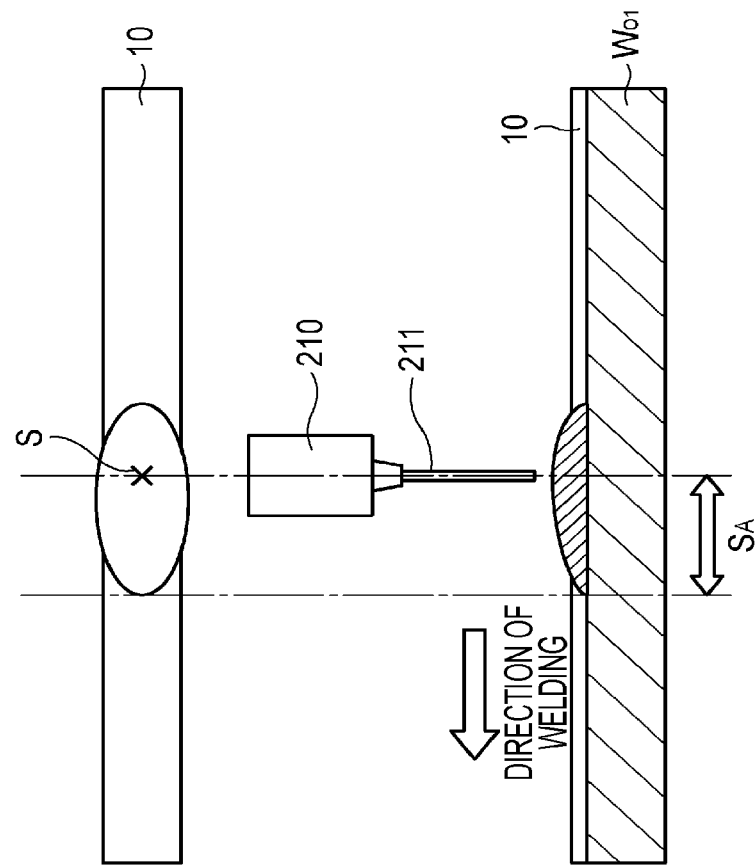
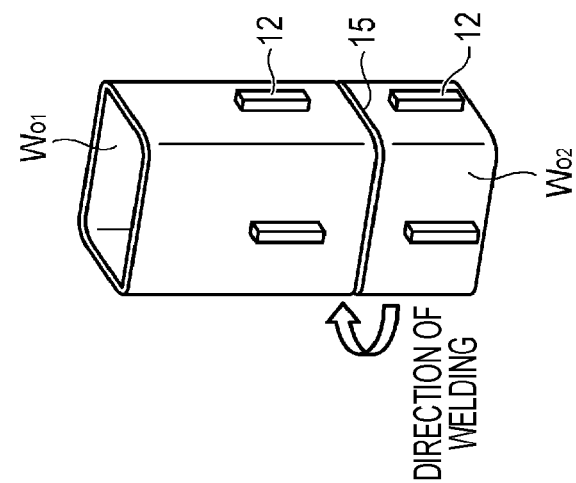

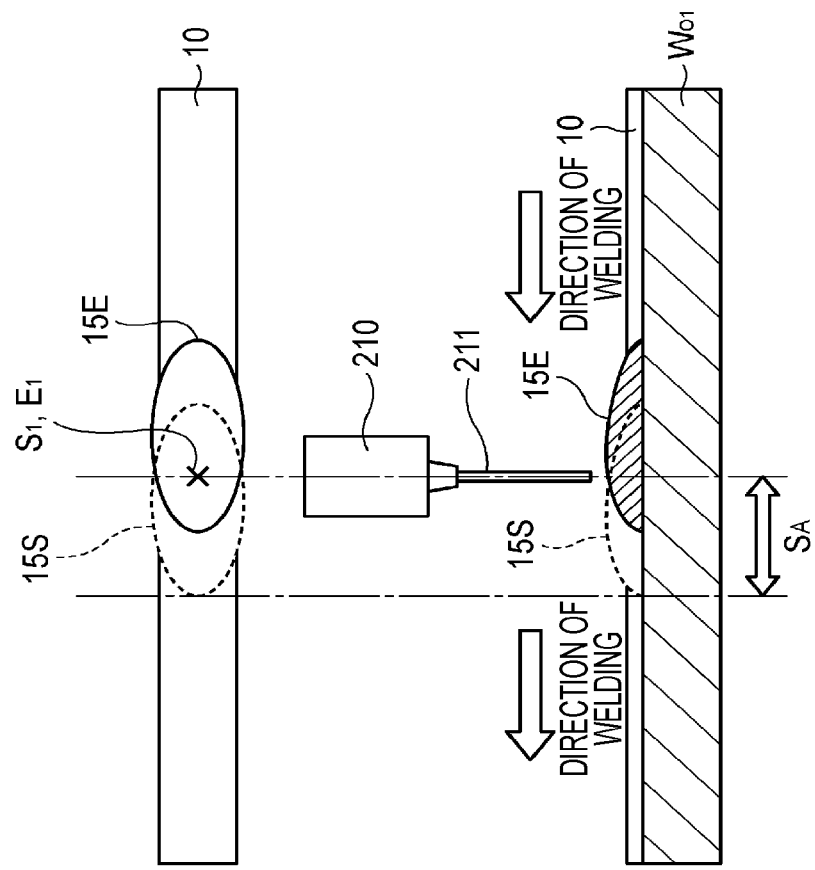
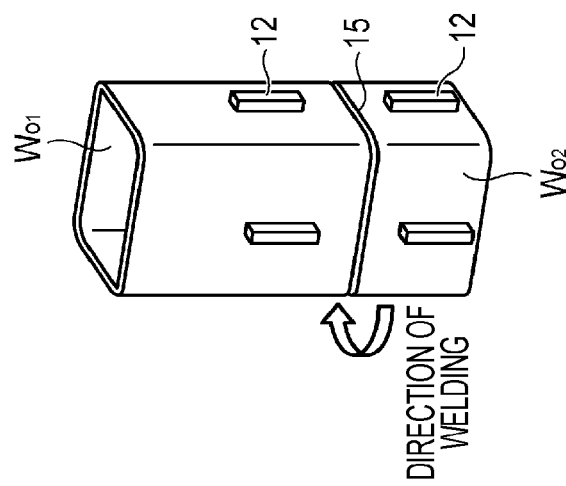
FIG. 12

GAS SHIELD ARC WELDING METHOD AND METHOD FOR MANUFACTURING STEEL PIPE

CROSS-REFERENCE TO RELATED APPLICATIONS

The present application is a 35 U.S.C. § 371 national stage application of International patent application PCT/JP2021/011709, filed Mar. 22, 2021. The entire contents of this application is incorporated herein by reference.

TECHNICAL FIELD

The present invention relates to a gas shield arc welding method and a method for manufacturing a steel pipe, and more particularly to a gas shield arc welding method for welding a steel pipe by multi-pass welding, and a method for manufacturing a steel pipe.

BACKGROUND ART

Joint welding of a polygonal/square steel pipe and a circular steel pipe in a construction site is performed with a steel frame erection adjusting tool attached to an erection piece, and a post fixed perpendicularly. In recent years, small portable welding robots and automatic machines have been applied to welding of a polygonal/square steel pipe and a circular steel pipe in order to improve the work efficiency. However, in general, the number of steel frame erection adjusting tools used per post is often four or more, and these steel frame erection adjusting tools block a groove, thus continuous welding is difficult. Consequently, even when small portable welding robots and automatic machines are used, the work efficiency may be lower as compared to semiautomatic welding.

PTL 1 described a welding method for an architectural polygonal/square steel pipe post, in which, of quadrants divided by steel frame erection adjusting tools provided on four faces of a joint section, opposed quadrants are welded for first several layers using a welding robot, and a weld end is grounded, and subsequently, two remaining quadrants are similarly welded for first several layers using another welding robot, and the steel frame erection adjusting tools are removed, then a semi perimeter is alternately welded for remaining several layers using two welding robots, while grinding a weld end.

CITATION LIST

Patent Literature

PTL 1: Japanese Unexamined Patent Application Publication No. 2018-53626

SUMMARY OF INVENTION

Technical Problem

However, according to the welding method for an architectural polygonal/square steel pipe post disclosed in PTL 1, joints are formed at four sites in the welding for the first several layers, and joints are formed at two sites in the welding for the remaining several layers. Note that in welding of a polygonal/square steel pipe and a circular steel pipe, the degree of difficulty of welding for the first layer and the second layer is high, and a weld defect tends to occur. In addition, a defect is more likely to occur at a joint of weld bead (hereinafter simply referred to as a "joint" or a "bead joint"). For this reason, there has been a need for a highly efficient welding method that can reduce the number of joints and prevent weld defects.

The present invention has been made in light of the above-described problem, and it is an object to provide a highly efficient gas shield arc welding method and a method for manufacturing a steel pipe that reduce the number of joints, which are the sites where defects are likely to occur, and that enable automatic welding with a welding robot.

Solution to Problem

The above-mentioned object of the present invention is achieved by the configuration (1) according to a gas shield arc welding method.

(1) A gas shield arc welding method for welding a steel pipe by multi-pass welding, the gas shield arc welding method comprising:
 a step in which a steel frame erection adjusting tool is attached to an erection piece provided on the steel pipe to fix a groove of the steel pipe;
 a step in which the groove is welded up to an initial single layer or several layers by semiautomatic welding or manual welding;
 a step in which the steel frame erection adjusting tool is removed after welding up to the initial single layer or several layers is finished; and
 a step in which remaining layers are welded by a welding robot so that bead joints are formed at two sites or less.

This configuration can provide a gas shield arc welding method that reduces the number of joints, which are the sites where defects are likely to occur, and that enables highly efficient automatic welding with a welding robot The preferred embodiments of the present invention according to the gas shield arc welding method relate to (2) to (9) below.

(2) The gas shield arc welding method according to (1), in which when the remaining layers are welded by a single piece of the welding robot, at the bead joints,
 in a first layer of the remaining layers,
 a weld start point is set to any position,
 a weld end point is set to a position exceeding the weld start point, and
 an overlapping portion of a weld bead from the weld start point to the weld end point is set to 10 to 20 mm, and
 in next and subsequent layers,
 a vicinity of a weld end point of a previous layer is set as a weld start point of the next layer,
 a weld end point is set to a position exceeding the weld start point, and
 an overlapping portion of a weld bead from the weld start point to the weld end point is set to 10 to 20 mm.

This configuration can prevent weld defects at bead joints where weld defects are likely to occur.

(3) The gas shield arc welding method according to (1), in which when the remaining layers are welded by a plurality of welding robots, each of which is the welding robot,
 at the bead joints,
 in a first layer of the remaining layers,
 for each of the plurality of welding robots,
 a weld start point is set to any position,
 a weld end point of one of the plurality of welding robots is set to a position exceeding the weld start point of an adjacent another one of the plurality of welding robots, and an overlapping portion of a weld bead from the weld start point to the weld end point is set to 10 to 20 mm, in next and subsequent layers, for each of the plurality of welding robots, a vicinity of a weld end point of a previous layer is set as a weld start point of the next layer, a weld end point of one of the plurality of welding robots is set to a position exceeding the weld start point of an adjacent another one of the plurality of welding robots, and an overlapping portion of a weld bead from the weld start point to the weld end point is set to 10 to 20 mm.

This configuration can prevent weld defects at bead joints where weld defects are likely to occur.

(4) The gas shield arc welding method according to (2) or (3), in which in a weld start range of 10 to 30 mm from the weld start point, a welding condition for at least one of welding current, welding speed, and distance between chip and base material is changed, a start welding current in the weld start range is set to 50 to 90% of the welding current of main welding, a start welding speed in the weld start range is set to 110 to 140% of the welding speed of the main welding, and an end distance between chip and base material in the weld start range is set to 50 to 120% of the distance between chip and base material of the main welding.

This configuration can prevent bulge of an overlapping portion by reducing a welding amount in the weld start range.

(5) The gas shield arc welding method according to any one of (2) to (4), in which in welding of the overlapping portion, a welding condition for at least one of welding current, welding speed, arc voltage, and distance between chip and base material is changed, an end welding current in the overlapping portion is set to 50 to 90% of the welding current of main welding, an end welding speed in the overlapping portion is set to 110 to 140% of the welding speed of the main welding, an end arc voltage in the overlapping portion is set to 50 to 90% of the arc voltage of the main welding, and an end distance between end chip and base material in the overlapping portion is set to 50 to 120% of the distance between chip and base material of the main welding.

This configuration can improve the appearance by performing a crater filling process after the main welding to remove depression of the weld bead.

(6) The gas shield arc welding method according to (1), in which when the remaining layers are welded by a single piece of the welding robot, at the bead joints, in a first layer of the remaining layers, a weld start point and a weld end point are set to a same position, and in next and subsequent layers, a vicinity of the weld end point of a previous layer is set as the weld start point of the next layer, or a position 5 to 20 mm forward or backward in a weld line direction from the weld end point of a previous layer is set as the weld start point of the next layer.

This configuration allows no overlapping portion at each bead joint, which facilitates guiding the weld start point and the weld end point.

(7) The gas shield arc welding method according to (1), in which when the remaining layers are welded by a plurality of welding robots, each of which is the welding robot, at the bead joints, in a first layer of the remaining layers, for each of the plurality of welding robots, a weld start point of one of the plurality of welding robots, and a weld start point of an adjacent another one of the plurality of welding robots are set to a same point, and in next and subsequent layers, for each of the plurality of welding robots, a vicinity of a weld end point of a previous layer is set as a weld start point of the next layer, or a position 5 to 20 mm forward or backward in a weld line direction from a weld end point of a previous layer is set as a weld start point of the next layer.

This configuration allows no overlapping portion at each bead joint, which facilitates guiding the weld start point and the weld end point.

(8) The gas shield arc welding method according to any one of (2) to (5), in which when the overlapping portion is welded, a period of 0.1 to 5 seconds for a crater filling process is provided at an end of the welding.

This configuration can improve the appearance performance by performing the crater filling process to remove depression of the weld bead.

(9) The gas shield arc welding method according to (8), in which a crater current, which is a welding current at a time of the crater filling process, is set to 50 to 90% of a welding current of main welding, and a transition period of 0.1 to 1 second is provided between the main welding and the crater filling process.

This configuration stabilizes the crater filling process subsequent to the transition period.

The above-mentioned object of the present invention is achieved by the configuration (10) according to a method for manufacturing a steel pipe.

(10) A method for manufacturing a steel pipe joined using the gas shield arc welding, the method including:

a step in which a steel frame erection adjusting tool is attached to an erection piece provided on the steel pipe to fix a groove of the steel pipe;

a step in which the groove is welded up to an initial single layer or several layers by semiautomatic welding or manual welding;

a step in which the steel frame erection adjusting tool is removed after welding up to the initial single layer or several layers is finished; and a step in which remaining layers are welded by a welding robot so that bead joints are formed at two sites or less.

This configuration can provide a method for manufacturing a steel pipe, that reduces the number of joints, which are the sites where defects are likely to occur, and that enables highly efficient automatic welding with a welding robot.

Advantageous Effects of Invention

According to the present invention, it is possible to provide highly efficient gas shield arc welding method and method for manufacturing a steel pipe that reduce the number of joints, which are the sites where defects are likely to occur, and that enable automatic welding with a welding robot.

BRIEF DESCRIPTION OF DRAWINGS

FIG. 7 is a plan view of the weld section as seen in a direction perpendicular to the groove, and a cross-sectional view at the groove, the weld section having the overlapping portion of weld beads from the weld start point to the weld end point.

FIG. 9 is a plan view of the weld start point and the weld start range as seen in a direction perpendicular to the groove, and a cross-sectional view of the groove.

FIG. 12 is a plan view of the weld section as seen in a direction perpendicular to the groove, and a cross-sectional view at the groove, the weld section having no overlapping portion of weld beads from a weld start point to a weld end point.

DESCRIPTION OF EMBODIMENTS

Hereinafter an embodiment of a gas shield arc welding method according to the present invention will be described in detail with reference to the drawings.

A gas shield arc welding method according to the present invention is a method for welding a steel pipe by multi-pass welding, the method including: a step in which a steel frame erection adjusting tool is attached to an erection piece provided on the steel pipe to fix a groove of the steel pipe; a step in which the groove is welded up to an initial single layer or several layers by semiautomatic welding or manual welding; a step in which the steel frame erection adjusting tool is removed after welding up to the initial single layer or several layers is finished; and a step in which remaining layers are welded by a welding robot so that bead joints are formed at two sites or less.

First, a portable welding robot will be described, which is preferable when the gas shield arc welding method is implemented. In the following description, an example of a portable welding robot as a welding robot will be described. However, the welding robot in the present invention is not limited to the portable welding robot, and for instance, a vertical articulated robot may be used.

[Portable Welding Robot]

Figure 1:
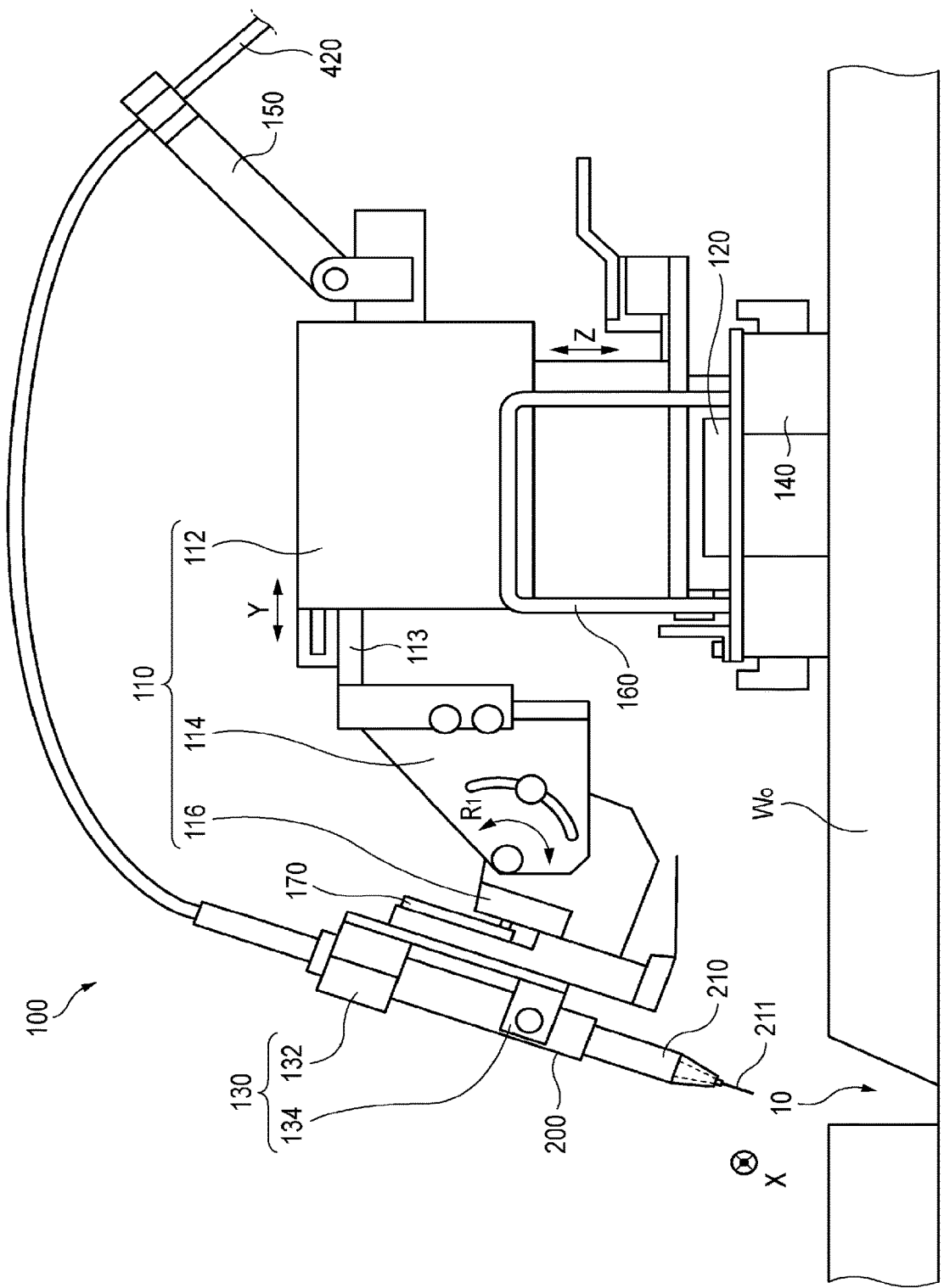
FIG. 1 is a schematic side view of a portable welding robot to which a gas shield arc welding method according to the present invention is preferably applied.
Figure 2:
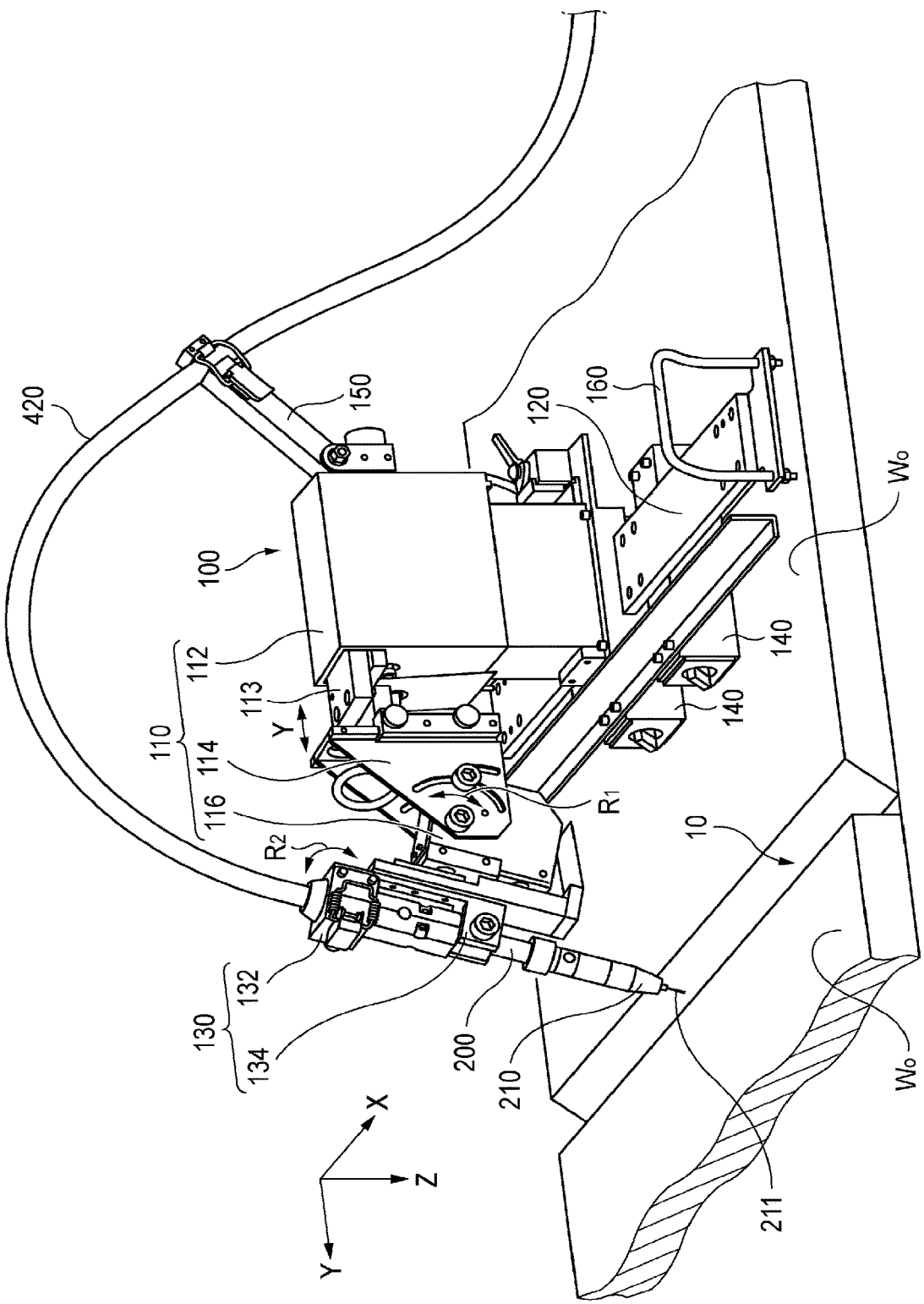
FIG. 2 is a perspective view of the portable welding robot illustrated in FIG. 1.

As illustrated in FIG. 1 and FIG. 2, a portable welding robot 100 includes a guide rail 120; a robot body 110 which is installed on the guide rail 120, and moves along the guide rail 120; and a torch connector 130 installed in the robot body 110. The robot body 110 is mainly comprised of a body 112 installed on the guide rail 120; a fixed arm 114 mounted on the body 112; and a movable arm 116 mounted on the fixed arm 114 rotatably in arrow $R_1$ direction.

The torch connector 130 is mounted on the movable arm 116 via a crank 170 which is a movable unit that allows a welding torch 200 to move in a weld line direction indicated by arrow X of FIG. 1. The torch connector 130 includes torch clamps 132, 134 that fix the welding torch 200. In addition, on the opposite side to the side of the body 112, on which the welding torch 200 is mounted, an advancing device which is not illustrated, and a cable clamp 150 are provided, which supports a conduit tube 420 connected to the welding torch 200.

In the embodiment, as a detection means, a touch sensor is used, which senses the surface or the like of the groove 10 on the work $W_o$ by applying a voltage across work $W_o$ and a welding wire 211, and utilizing a voltage drop phenomenon which occurs when the welding wire 211 comes into contact with the work $W_o$. The detection means is not limited to the touch sensor of the embodiment, and an image sensor using visual sensing or a laser sensor using laser sensing, or a combination of these sensing means may be used. However, for sake of simplicity of the device configuration, it is preferable that the touch sensor of the embodiment be used.

The body 112 of the robot body 110 includes a robot driver that drives the robot body 110 in a direction perpendicular to the plane of paper as indicated by arrow X of FIG. 1, in other words, in the X direction in which the robot body 110 is moved along the guide rail 120. The body 112 can also be driven in the Z direction for moving in a depth direction of the groove portion 10, the depth direction being perpendicular to the X direction. The fixed arm 114 can also be driven in the Y direction with respect to the body 112 via a slide support member 113, the Y direction being perpendicular to the X direction and the width direction of the groove 10.

Furthermore, the torch connector 130 on which the welding torch 200 is mounted can be driven in a swinging manner in a front-back direction in the X-direction by rotating the crank 170 as indicated by arrow $R_2$ of FIG. 2, the front-back direction being the weld line direction. In addition, the movable arm 116 is rotatably mounted on the fixed arm 114 as indicated by the arrow $R_1$, and can be adjusted to an optimal angle and fixed.

Based on the foregoing, the robot body 110 can drive its leading end, that is, the welding torch 200 with three degrees of freedom. However, the robot body 110 is not limited to this, and may be able to drive the welding torch 200 with any number of degrees of freedom according to the application.

With the configuration as described above, the leading end of the welding torch 200 mounted on the torch connector 130 can be oriented to any direction. Furthermore, the robot body 110 can be driven on the guide rail 120 in the X direction of FIG. 1. The welding torch 200 can perform weaving welding by the movement of the robot body 110 in the X direction while moving back and forth in the Y direction. In addition, the welding torch 200 can be tilted by driving the crank 170 according to the working condition such as a push angle or a drag angle provided, for instance. Furthermore, change in torch angle, in other words, a push angle or a drag angle can be corrected by tilting the welding torch 200 in the X direction by driving the crank 170, the change in torch angle being caused, for instance when the curvature is different between a corner of the work $W_o$ such as a polygonal/square steel pipe and a curved portion 122 of the guide rail 120 described below.

For instance, a mounting member 140 such as a magnet is provided below the guide rail 120, which is configured to be easily attached or detached to or from the work $W_o$ by the mounting member 140. When the portable welding robot 100 is to be set to the work $W_o$, an operator can easily set the portable welding robot 100 to the work $W_o$ by gripping both side handles 160 of the portable welding robot 100.

[Welding Method]

Figure 3:
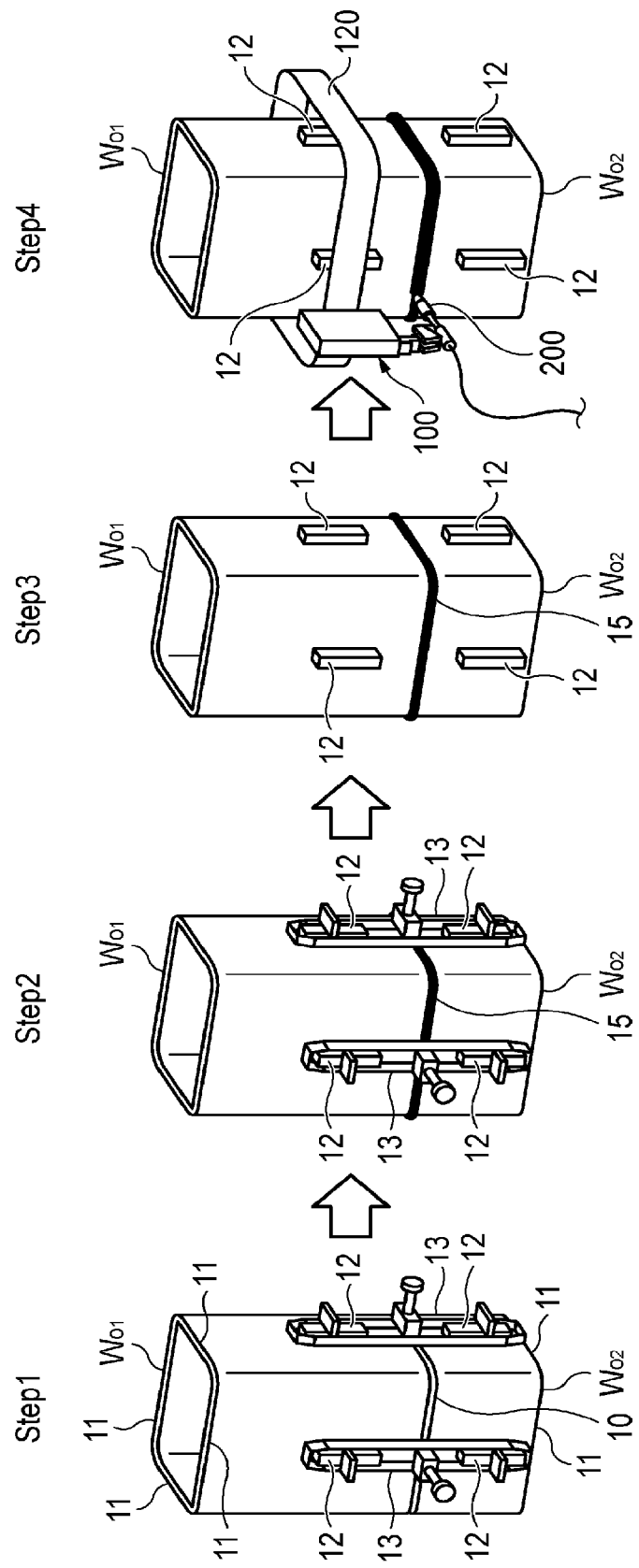
FIG. 3 is a process chart illustrating a schematic procedure of the gas shield arc welding method according to the present invention.

Welding of a steel pipe by a gas shield are welding method using the above-described portable welding robot 100 is often performed by butt welding, which is carried out by the following procedure illustrated in FIG. 3. Note that in the following description, an example of a polygonal/square steel pipe as a steel pipe will be described. However, the steel pipe in the present invention is not limited to the polygonal/square steel pipe, and for instance, a circular steel pipe may be used.

As illustrated in Step 1 of FIG. 3, first, an erection peace 12 is fixed to each of four sides 11 of a pair of polygonal/square steel pipes $W_{o1}$, $W_{o2}$ by welding, then a steel frame erection adjusting tool 13 is mounted on the erection peace 12 to fix the groove 10.

Subsequently, as illustrated in Step 2, welding is performed in the fixed groove 10 up to an initial single layer or several layers by semiautomatic welding or manual welding to form a weld bead 15. Note that it is difficult to perform continuous welding because in the portion on which the steel frame erection adjusting tool 13 is mounted, the steel frame erection adjusting tool 13 interferes with welding.

In general, in the initial stage of welding, a weld defect tends to occur in a weld section. However, the occurrence of a weld defect can be reduced to a minimum by performing semiautomatic welding or manual welding in the initial stage of welding. Note that the initial stage of welding by the semiautomatic welding or the manual welding is not limited to the initial single layer or several layers, and may be extended subsequent to the several layers. However, from the viewpoint of work efficiency, the initial stage of welding is preferably short as much as possible, and is preferably limited up to three layers at most.

Subsequently, as illustrated in Step 3, the steel frame erection adjusting tools 13 are removed from the pair of polygonal/square steel pipes $W_{o1}$, $W_{o2}$ in which the weld bead 15 is formed for the initial single layer or several layers by the semiautomatic welding or the manual welding.

Furthermore, as illustrated in Step 4, the guide rail 120 is mounted along the outer surface of the polygonal/square steel pipe Wo1, and the portable welding robot 100 is mounted on the guide rail 120 with the welding torch 200 facing downward. Multi-pass welding is performed by welding the remaining layers automatically using the portable welding robot 100 so that the bead joints are formed at two sites or less. Note that the automatic welding by portable welding robot 100 is preferably performed by at most two pieces of the portable welding robot 100, or preferably by a single piece of the portable welding robot 100 in order to reduce the number of bead joints as much as possible, where a weld defect is likely to occur.

The process of these Step 1 to 4 can reduce the number of bead joints in the automatic welding section as much as possible, thus enables automatic continuous welding without stopping the welding half way through, thereby improving the work efficiency significantly. This effect is large, and although the work efficiency for the work up to the initial single layer or several layers is low to some extent due to the semiautomatic welding or the manual welding, the work efficiency on the whole improves than the conventional method.

Next, the case of welding having an overlapping portion of weld beads from a weld start point to a weld end point, and the case of welding not having the overlapping portion each will be described in detail. The multi-pass welding for the remaining layers by the portable welding robot 100 includes welding having an overlapping portion of weld beads from a weld start point to a weld end point, and welding not having the overlapping portion. In the welding having the overlapping portion, a weld defect, which is likely to occur at a bead joint, can be prevented by forming a weld bead while shifting the weld start point for each layer.

[Welding Having Overlapping Portion]

Figure 4:
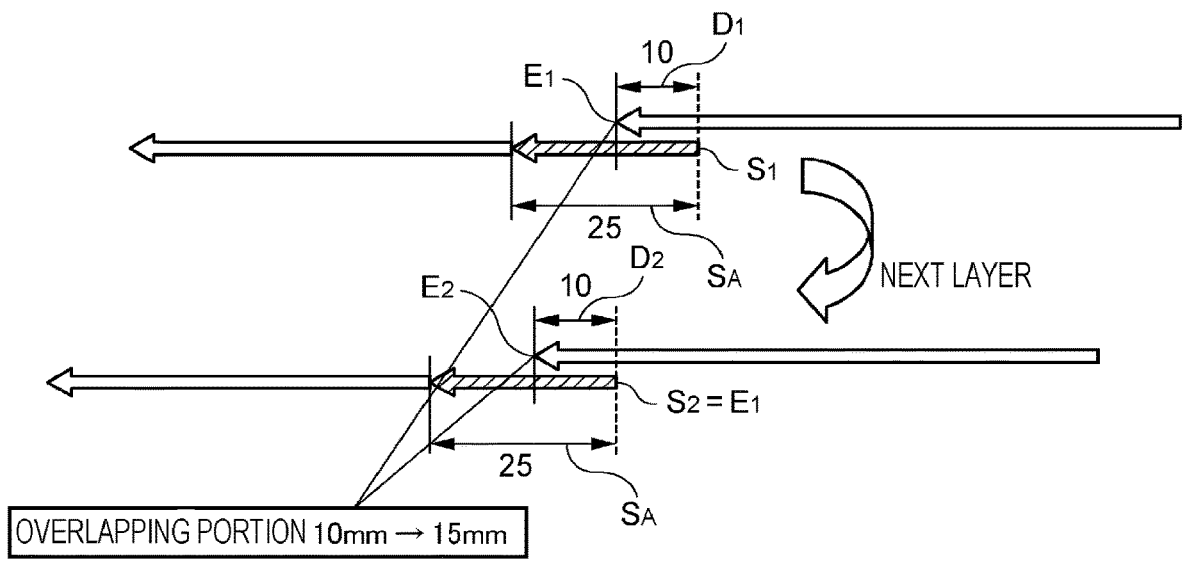
FIG. 4 is a schematic view illustrating an overlapping portion in welding having the overlapping portion of weld beads from a weld start point to a weld end point.
Figure 5:
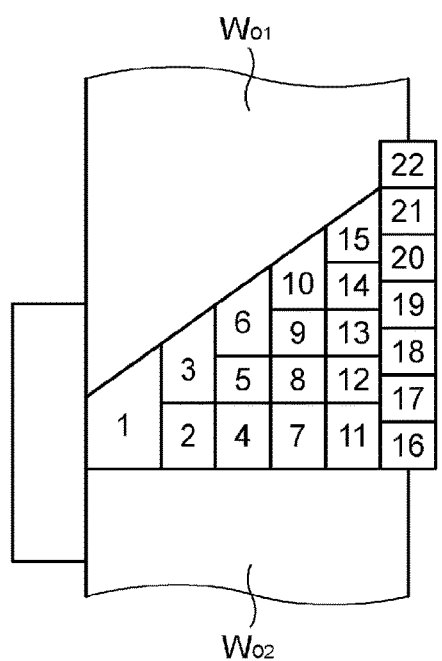
FIG. 5 is a schematic cross-sectional view illustrating a relationship between passes and layers in multi-pass welding.

First, welding having the overlapping portion will be described with reference to FIG. 4 and FIG. 5. FIG. 4 illustrates the relationship between the weld start point and the weld end point in each of the remaining layers, that is, the overlapping portion. FIG. 5 is a schematic cross-sectional view illustrating the relationship between passes and layers in multi-pass welding, and the numerals in FIG. 5 indicate the order of pass. The example illustrated in the FIG. 5 indicates that 1 pass for the first layer, 2 pass and 3 pass for the second layer, 4 pass, 5 pass and 6 pass for the third layer . . . are formed. Note that multiple passes may be provided for the first layer depending on Gap.

For instance, when manual welding is performed up to the first and second layers of FIG. 5, the first one of the remaining layers which are welded automatically by the portable welding robot 100 is the third layer illustrated in FIG. 5. As illustrated in FIG. 5, the third layer is comprised of 4 pass, 5 pass and 6 pass, and at the bead joint of each pass, an overlapping portion $D_1$ of weld beads from weld start point $S_1$ to weld end point $E_1$ is set as illustrated in FIG. 4. The overlapping portion $D_1$ is preferably set in a range of 10 to 20 mm. For instance, the overlapping portion $D_1$ is set to 10 mm in FIG. 4. Then, welding for the next layer, that is, the fourth layer illustrated in FIG. 5 is comprised of 7 pass to 10 pass, and at the bead joint of each pass, the weld end point for the third layer, that is, the vicinity of weld end point $E_1$ illustrated in FIG. 4 is set as the weld start point for the fourth layer, that is, weld start point $S_2$ illustrated in FIG. 4, then an overlapping portion $D_2$ of weld beads from the weld start point $S_2$ to weld end point $E_2$ is set. The overlapping portion $D_2$ is preferably set in a range of 10 to 20 mm. For instance, the overlapping portion $D_2$ is set to 10 mm in FIG. 4. Furthermore, for the next layer, that is, the fifth and subsequent layers, the vicinity of the weld end point of the previous layer is set as the weld start point, then a process of welding is performed up to the weld end point so as to have an overlapping portion, and this process is repeated up to the final layer (repeated up to the sixth layer in FIG. 5).

The multi-pass welding for the remaining layers assumes the case of welding with a single portable welding robot 100 and the case of welding with a plurality of portable welding robots 100.

First, the welding with a single portable welding robot 100 will be described.

Figure 6:
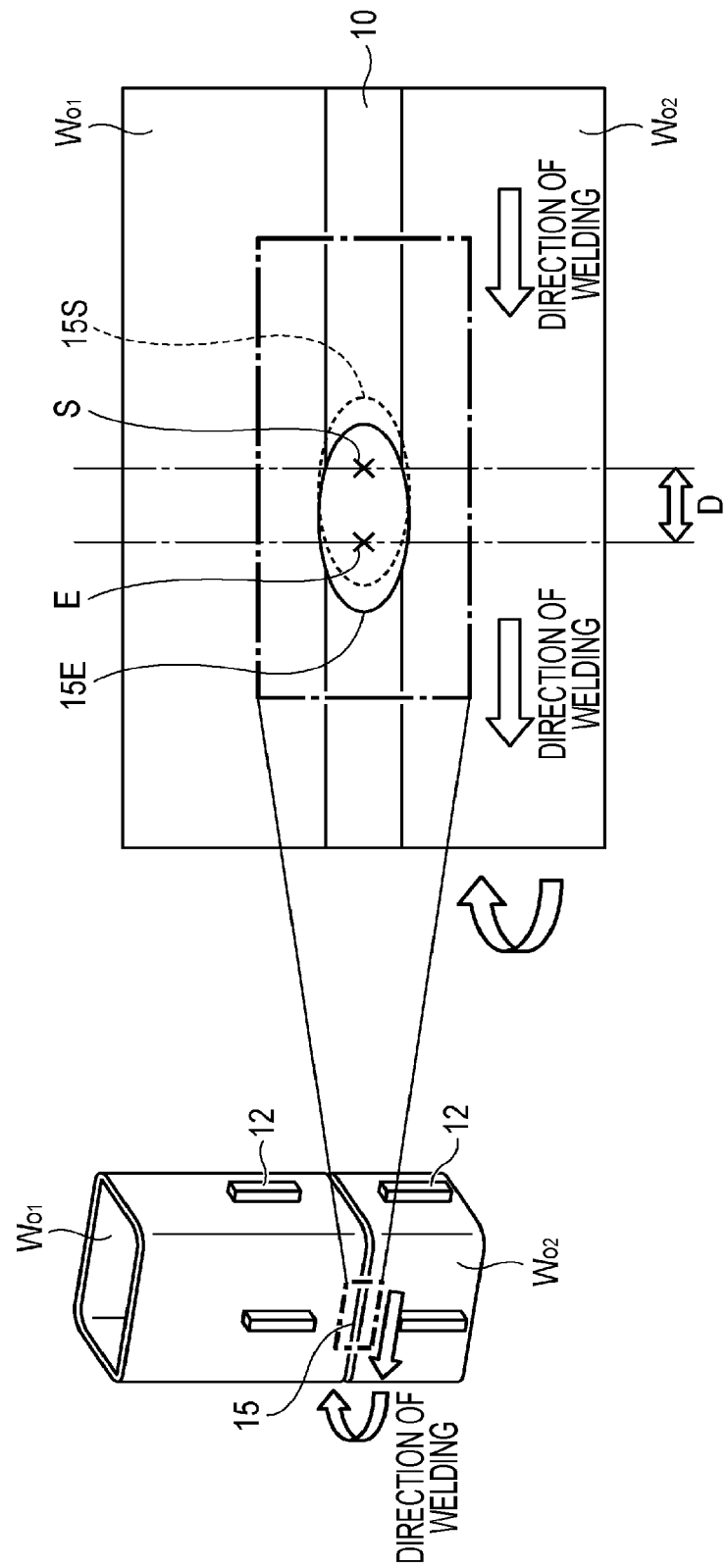
FIG. 6 is a plan view of a weld section as seen in a direction perpendicular to a groove, the weld section having an overlapping portion of weld beads from a weld start point to a weld end point.

As illustrated in FIG. 6 and FIG. 7, in each pass of the remaining layers, the weld end point E is set to the position exceeding the weld start point S, and the overlapping portion D of weld beads from the weld start point S to the weld end point E is set to any length. The weld start point S is the position of the welding wire 211 at the start of welding. The weld end point E is the position of the welding wire 211 at the end of welding. Then, start weld bead 15S formed in the groove 10 at the start of welding, and end weld bead 15E formed in the groove 10 at the end of welding form the overlapping portion D from the weld start point S to the weld end point E.

Note that the vicinity indicates the range of a circle radius of 5 mm at the center of the weld end point E, that is, 0 to 5 mm. Shifting the weld start point S from the weld end point E can avoid slag which is likely to occur at a weld end position, and allows welding to be started while ensuring a conductive property, thus the are start property improves. For instance, in order to obtain the arc start property, the weld end point E may be set to a position displaced from the center of the bead width in advance, and the weld start point S may be provided at the central position of the bead width, after the welding is finished, movement may be made from the weld end point E to the weld start point S, and welding for the next pass may be started.

Similarly, also for the next and subsequent layers, the vicinity of the weld end point E for the previous layer is set as the weld start point S for the next layer, and the weld end point E for the next layer is set to a position exceeding the weld start point S for the next layer to form the overlapping portion D. Note that more preferable length of the overlapping portion D is approximately 15 mm.

Figure 8:
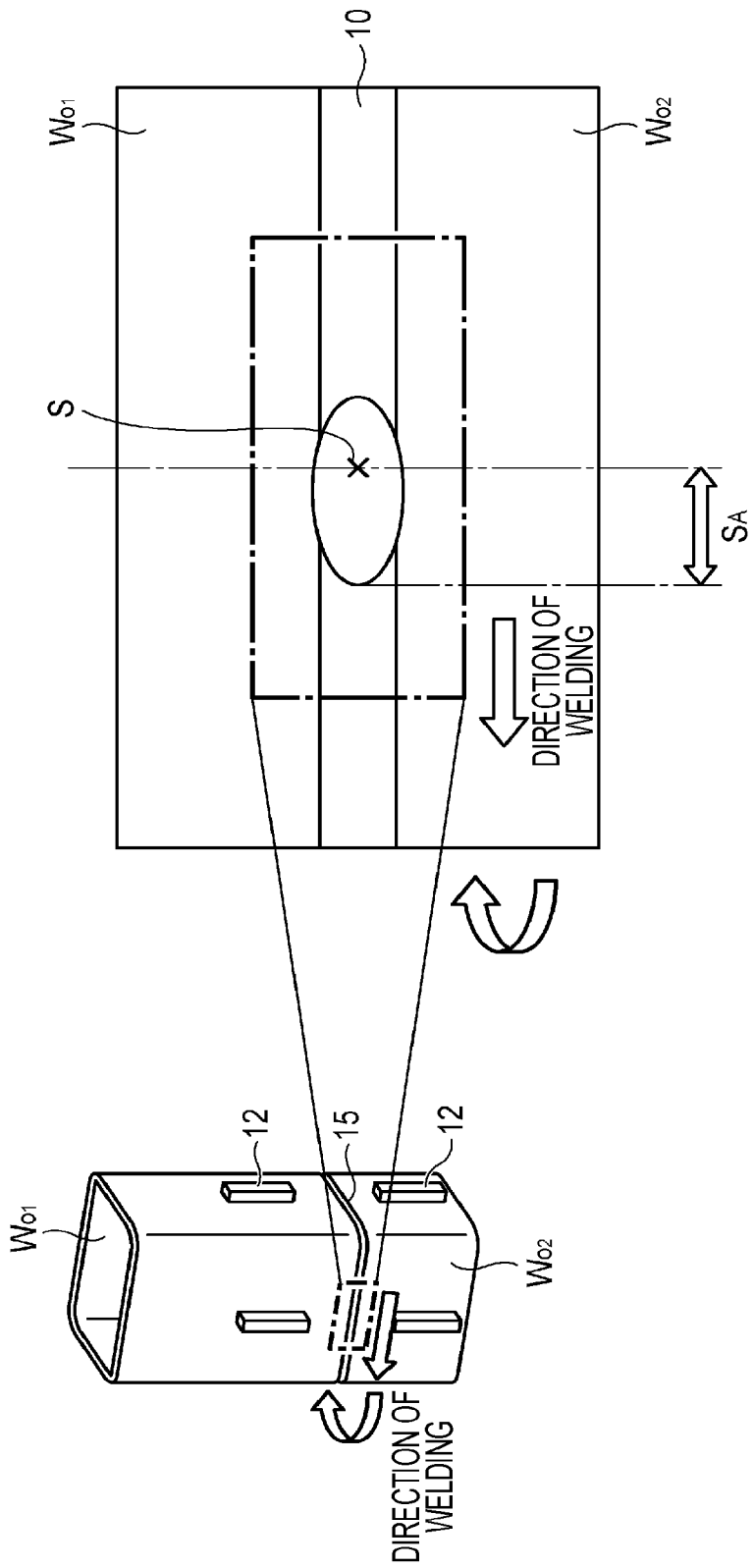
FIG. 8 is a plan view of the weld start point and a weld start range as seen in a direction perpendicular to the groove.

Subsequently, referring to FIG. 8 and FIG. 9, in weld start range $S_A$ of 10 to 30 mm from the weld start point S for each layer, the welding condition for at least one of welding current, welding speed, and distance between chip and base material is preferably controlled in the following range. For instance, the weld start range $S_A$ is set to 25 mm in FIG. 4. Specifically, the start welding current in the weld start range $S_A$ is set to 50 to 90% of the welding current of the main welding. For instance, when the welding current of the main welding is 200 to 300 A, the start welding current in the weld start range $S_A$ is in a range of 150 A to 250 A. In addition, the start welding speed in the weld start range $S_A$ is set to 110 to 140% of the welding speed of the main welding. For instance, when the welding speed of the main welding is 10 to 60 cm/min, the start welding speed in the weld start range $S_A$ is a range of 11 to 84 cm/min. The distance between the chip and the base material in the weld start range $S_A$ is set to 50 to 120% of the distance between the chip and the base material of the main welding. For instance, when the distance between the chip and the base material of the main welding is 20 to 30 mm, the distance between the chip and the base material in the weld start range $S_A$ is in a range of 15 to 35 mm.

In this manner, changing the welding condition for at least one of welding current, welding speed, and distance between chip and base material in the weld start range $S_A$ can reduce the welding amount in the weld start range $S_A$, and prevent bulge of the overlapping portion D.

In the overlapping portion D of weld beads from the weld start point S to the weld end point E, the welding condition for at least one of welding current, welding speed, arc voltage and distance between chip and base material is preferably controlled in the following range. Specifically, the end welding current in the overlapping portion D is set to 50 to 90% of the welding current of the main welding, the end welding speed in the overlapping portion D is set to 90 to 140% of the welding speed of the main welding, the end are voltage in the overlapping portion D is set to 50 to 90% of the arc voltage of the main welding, and the distance between the end chip and the base material in the overlapping portion D is set to 50 to 120% of the end distance between the chip and the base material of the main welding. For instance, when the welding current of the main welding is 220 to 300 A, the end welding current in the overlapping portion D is set to 150 to 250 A, when the welding speed of the main welding is 25 to 80 cm/min, the end welding speed in the overlapping portion D is set to 30 to 90 cm/min, when the are voltage of the main welding is 21 to 33 V, the end arc voltage in the overlapping portion D is set to 15 to 28 V, and when the distance between the chip and the base material of the main welding is 20 to 30 mm, the end distance between the end chip and the base material in the overlapping portion D is set to 15 to 35 mm.

In this manner, changing the welding condition for at least one of welding current, welding speed, arc voltage and distance between chip and base material in the overlapping portion D can improve the appearance by performing a crater filling process after the main welding to remove depression of the weld bead 15.

As described above, welding without weld defects, bulge, and depression in the overlapping portion D is made possible by changing the welding condition for at least one of welding current, welding speed, and distance between chip and base material in the weld start range $S_A$ of 10 to 30 mm from the weld start point S for each layer, or changing the welding condition for at least one of welding current, welding speed, are voltage and distance between chip and base material in the overlapping portion D of weld beads from the weld start point S to the weld end point E to form the overlapping portion D.

Figure 10:
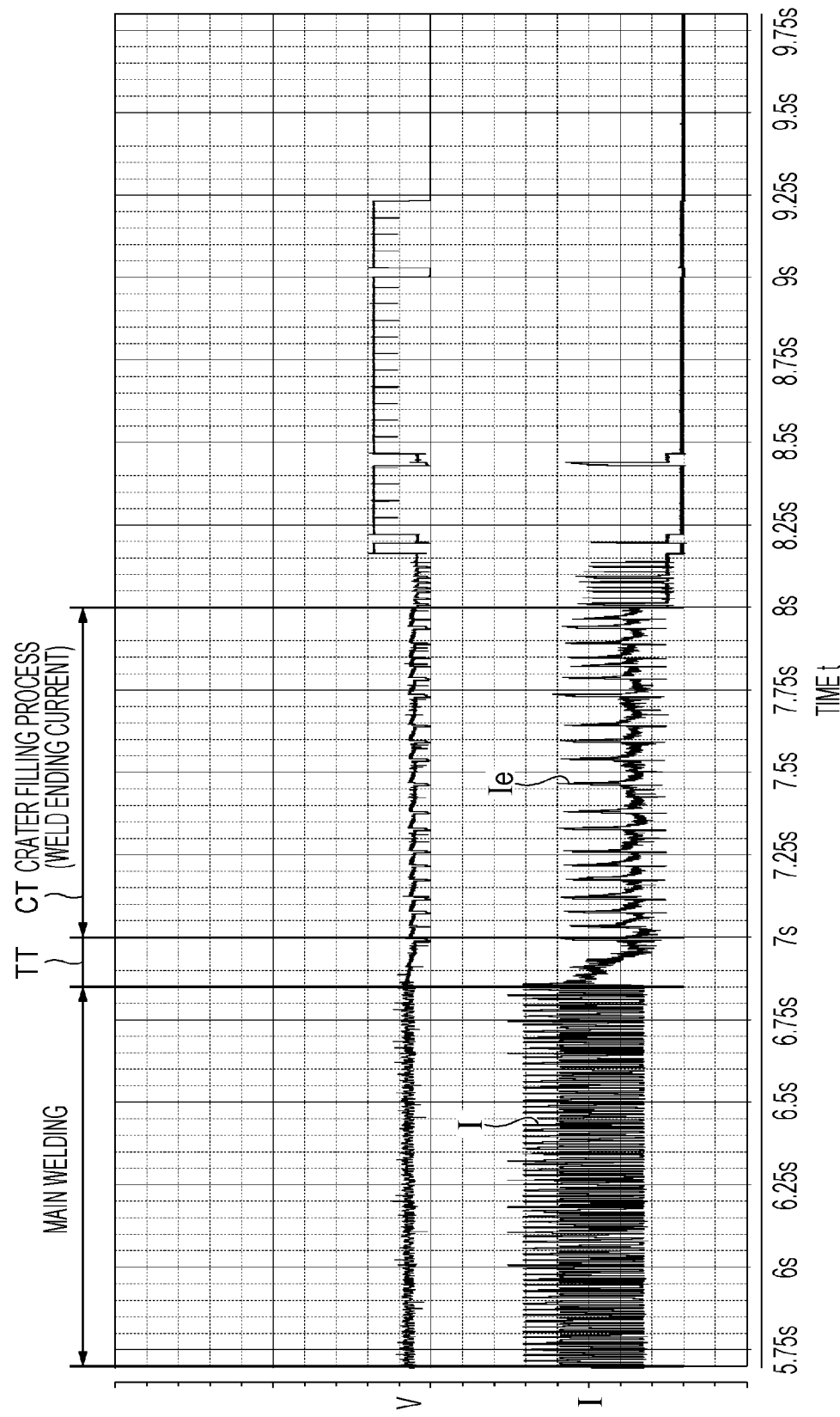
FIG. 10 is a graph illustrating a relationship between main welding, a crater filling process, and a transition period from the main welding to the crater filling process.

As illustrated in FIG. 10, it is preferable that the crater current, which is the welding current at the weld end point E at the time of the crater filling process, that is, the end welding current Ie be set to 50 to 90% of the welding current I of the main welding, and period CT of 0.1 to 5 seconds for a crater filling process be provided. Thus, the appearance can be improved by performing the crater filling process to remove depression of the weld bead 15.

Note that for the crater filling process, in addition to change in welding current, and process time, change in welding conditions, such as are voltage, stickout length, welding speed and gas flow rate, and push angle or drag angle due to change in torch angle, or position change by back-stop may be made. It is more preferable that change in welding conditions and change in position be combined. For instance, the stickout may be reduced once at the time of crater filling process, and movement may be made to a weld start point immediately after the weld end to finish the operation, and this process can prevent fusion between the welding wire and beads. Note that here, the change in stickout indicates the change in welding conditions, and the movement after the weld is finished indicates the change in position.

In addition, transition period TT of 0.1 to 1 second is preferably provided between the main welding and the crater filling process. Thus, weld defects at the weld end point E can be prevented by performing the crater filling process subsequent to the transition period TT in a stable manner, and the appearance can be improved by removing depression of the weld bead 15.

Next, welding with a plurality of portable welding robots 100 will be described. Herein, an example of welding with two portable welding robots 100 will be described with reference to FIG. 4.

First, the weld start points S of two portable welding robots 100 are set at positions with different phases by 180 degrees. The two portable welding robots 100 are moved in the same direction to perform welding. Then, the weld end point E of one of the welding robots 100 is set to a position exceeding the weld start point S of the other of the welding robots 100, and the weld end point E of the other of the welding robots 100 is set to a position exceeding the weld start point S of the one of the welding robots 100, then for each of the two welding robots 100, the overlapping portion D of weld beads from the weld start point S to the weld end point E is set to 10 to 20 mm.

For the next and subsequent layers, the vicinity of the weld end point E for the previous layer is set as the weld start point S for the next layer, the weld end point E of one of the welding robots 100 is set to a position exceeding the weld start point S of the other of the welding robots 100, and the weld end point E of the other of the welding robots 100 is set to a position exceeding the weld start point S of the one of the welding robots 100, then for each of the two welding robots 100, the overlapping portion D of weld beads from the weld start point S to the weld end point E is set to 10 to 20 mm.

[Welding Having No Overlapping Portion]

Figure 11:
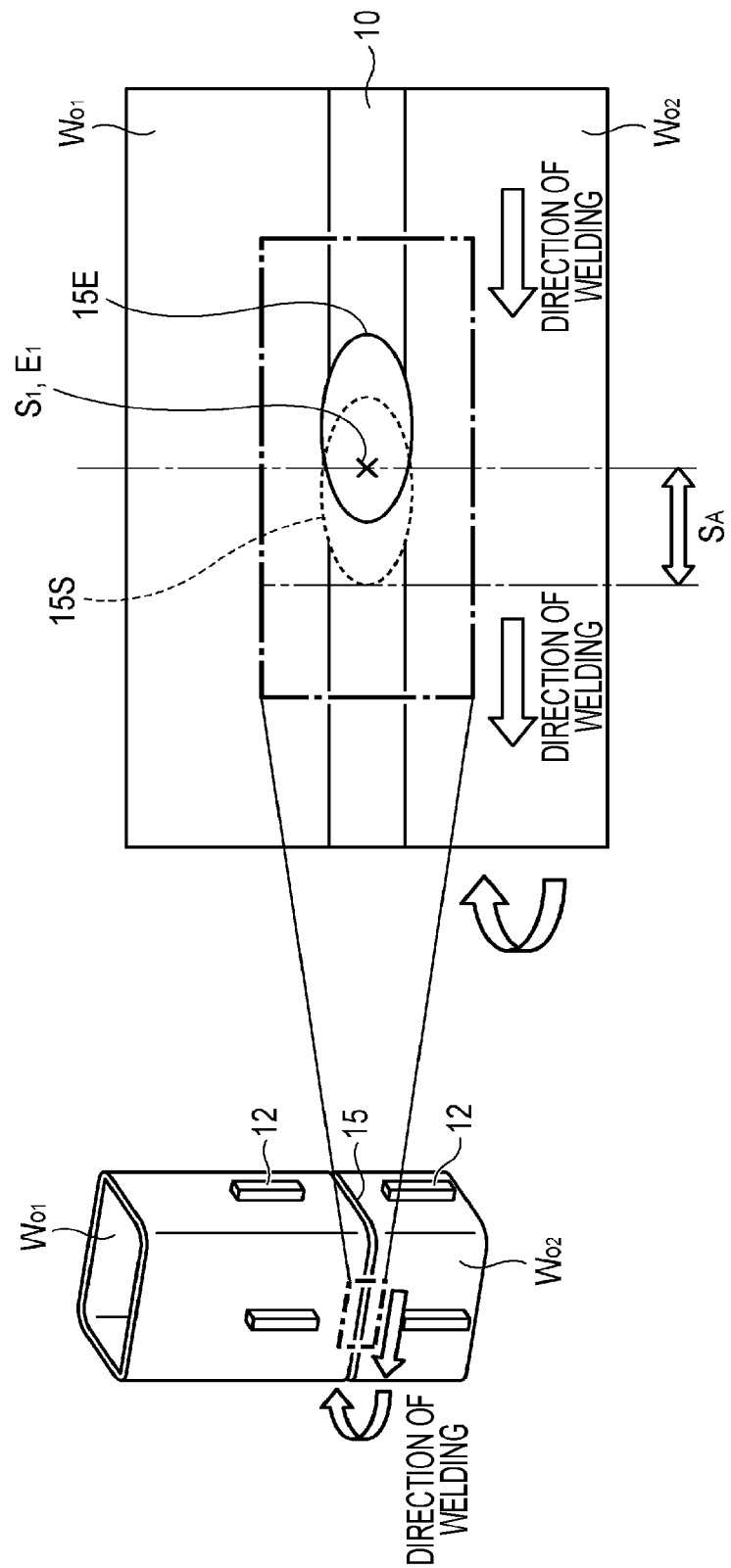
FIG. 11 is a plan view of a weld section as seen in a direction perpendicular to the groove, the weld section having no overlapping portion of weld beads from a weld start point to a weld end point.

Next, welding having no overlapping portion of weld beads from the weld start point S to the weld end point E with a single portable welding robot 100 will be described with reference to FIG. 11 and FIG. 12. Also, for welding not having the overlapping portion, the relationship between passes and layers in multi-pass welding illustrated in FIG. 5 similarly holds. In welding not having the overlapping portion, at each bead joint, in each j among the remaining layers, the weld start point $S_1$ and the weld end point $E_1$ are set to the same position, and in each pass of the next and subsequent layers, the vicinity of the weld end point $E_1$ of the previous layer is welded as the weld start point $S_2$ of the next layer, or the position 5 to 20 mm forward or backward in the weld line direction from the weld end point $E_1$ is welded as the weld start point $S_2$ of the next layer. Then the weld end point $E_2$ is set to the same position as the weld start point $S_2$.

Note that the vicinity indicates the range of a circle radius of 5 mm at the center of the weld end point E, that is, 0 to 5 mm. Shifting the weld start point S from the weld end point E allows can prevent slag which is likely to occur at a weld end position and allows welding to be started, thus the arc start property improves. For the case of welding not having the overlapping portion, it is advantageous in that the weld start point S and the weld end point E are easily guided.

In addition, in also welding having no overlapping portion of weld beads using a plurality of welding robots 100, similarly to what has been described above, in the first one of the remaining layers, the weld start point S of one of the welding robots, and the weld end point E of the other of the welding robots are set to the same position. For the next and subsequent layers, in each of the plurality of welding robots 100, the vicinity of the weld end point E for the previous layer is set as the weld start point S for the next layer, or the position 5 to 20 mm forward or backward in the weld line direction from the weld end point E is set as the weld start point S of the next layer, then the weld end point E of one of the welding robots 100 is set as the weld start point S of the other of the welding robots 100, and the weld end point E of the other of the welding robots 100 is set as the weld start point S of the one of the welding robots 100 to perform welding having no overlapping portion.

Note that the present invention is not limited to the embodiments described above, and variations, and improvements can be made as appropriate.

Although various embodiments have been described with reference to the drawings so far, it is needless to say that the present invention is not limited to those examples. It is apparent that various modifications and alterations will occur to those skilled in the art within the scope of the appended claims, and it should be understood that those modifications and alterations naturally fall within the technical scope of the present invention. In a range without departing from the spirit of the present invention, the components in the above embodiments may be combined in any manner.

Note that this application is based on Japanese Patent Application (No. 2020-071284) filed on Apr. 10, 2020, the entire contents of which are incorporated herein by reference.

REFERENCE SIGNS LIST

10 groove
12 erection piece
13 steel frame erection adjusting tool
15 weld bead
100 portable welding robot (welding robot)
CT crater filling process period
D, $D_1$, $D_2$ overlapping portion
E, $E_1$, $E_2$ weld end point
T welding current
S, $S_1$, $S_2$ weld start point
$S_A$ weld start range
TT transition period
Wo, $Wo_1$, $Wo_2$ work (polygonal/square steel pipe, steel pipe)

The invention claimed is:

1. A gas shield arc welding method for welding a steel pipe by multi-pass welding, comprising:
    attaching a steel frame erection adjusting tool to an erection piece provided on the steel pipe, such that a groove of the steel pipe is fixed;
    welding up the groove, by semiautomatic welding or manual welding, to an initial single layer or several layers;
    removing the steel frame erection adjusting tool after the welding up of the groove is finished;
    welding remaining layers by a single piece of a welding robot such that bead joints are formed at two sites or less, wherein the welding the remaining layers includes, at the bead joints, in a first layer of the remaining layers, setting a weld start point to any position, setting a weld end point to a position exceeding the weld start point, and setting an overlapping portion of a weld bead from the weld start point to the weld end point to 10 to 20 mm; and
    welding next and subsequent layers, including setting a circle, the circle having a radius of 0 to 5 mm and a weld end point of a previous layer as a center of the circle, as a weld start point of a next layer, setting a weld end point to a position exceeding the weld start point, and setting an overlapping portion of a weld bead from the weld start point to the weld end point to 10 to 20 mm.

2. A gas shield arc welding method for welding a steel pipe by multi-pass welding, comprising:
    attaching a steel frame erection adjusting tool to an erection piece provided on the steel pipe, such that a groove of the steel pipe is fixed;
    welding up the groove, by semiautomatic welding or manual welding, to an initial single layer or several layers;
    removing the steel frame erection adjusting tool after the welding up of the groove is finished; and welding remaining layers by at least one welding robot such that bead joints are formed at two sites or less, wherein the at least one robot includes a plurality of welding robots, wherein the remaining layers are welded by the plurality of welding robots, wherein the welding the remaining layers includes, at the bead joints, in a first layer of the remaining layers, for each of the plurality of welding robots, setting a weld start point to any position, setting a weld end point of one of the plurality of welding robots to a position exceeding a weld start point of an adjacent another one of the plurality of welding robots, and setting an overlapping portion of a weld bead from the weld start point to the weld end point to 10 to 20 mm, and wherein the method further comprises welding next and subsequent layers, for each of the plurality of welding robots, including setting a circle, the circle having a radius of 0 to 5 mm and a weld end point of a previous layer as a center of the circle, as a weld start point of a next layer, setting a weld end point of one of the plurality of welding robots to a position exceeding a weld start point of an adjacent another one of the plurality of welding robots, and setting an overlapping portion of a weld bead from the weld start point to the weld end point to 10 to 20 mm.

3. The method according to claim 1,
wherein in a weld start range of 10 to 30 mm from the weld start point, a welding condition for at least one of welding current, welding speed, and distance between chip and base material is changed,
a start welding current in the weld start range is set to 50 to 90% of a welding current of a main welding,
a start welding speed in the weld start range is set to 110 to 140% of a welding speed of the main welding, and
a distance between chip and base material in the weld start range is set to 50 to 120% of a distance between chip and base material of the main welding.

4. The method according to claim 1,
wherein in a welding of the overlapping portion, a welding condition for at least one of welding current, welding speed, arc voltage, and distance between chip and base material is changed,
an end welding current in the overlapping portion is set to 50 to 90% of a welding current of a main welding,
an end welding speed in the overlapping portion is set to 110 to 140% of a welding speed of the main welding,
an end arc voltage in the overlapping portion is set to 50 to 90% of an arc voltage of the main welding, and
an end distance between end chip and base material in the overlapping portion is set to 50 to 120% of a distance between chip and base material of the main welding.

5. The method according to claim 1,
wherein welding the overlapping portion includes providing a period of 0.1 to 5 seconds for a crater filling process at an end of the welding.

6. The method according to claim 5, comprising:
setting a crater current, which is a welding current at a time of the crater filling process, to 50 to 90% of a welding current of a main welding, and
providing a transition period of 0.1 to 1 second between the main welding and the crater filling process.

7. The method according to claim 1, wherein the radius of the circle is 0 mm such that the weld start point of the next layer is the weld end point of the previous layer.

8. The method according to claim 2, wherein the radius of the circle is 0 mm such that the weld start point of the next layer is the weld end point of the previous layer.

9. The method according to claim 2,
wherein in a weld start range of 10 to 30 mm from the weld start point, a welding condition for at least one of welding current, welding speed, and distance between chip and base material is changed,
a start welding current in the weld start range is set to 50 to 90% of a welding current of a main welding,
a start welding speed in the weld start range is set to 110 to 140% of a welding speed of the main welding, and
a distance between chip and base material in the weld start range is set to 50 to 120% of a distance between chip and base material of the main welding.

10. The method according to claim 2,
wherein in a welding of the overlapping portion, a welding condition for at least one of welding current, welding speed, arc voltage, and distance between chip and base material is changed,
an end welding current in the overlapping portion is set to 50 to 90% of a welding current of a main welding,
an end welding speed in the overlapping portion is set to 110 to 140% of a welding speed of the main welding,
an end arc voltage in the overlapping portion is set to 50 to 90% of an arc voltage of the main welding, and
an end distance between end chip and base material in the overlapping portion is set to 50 to 120% of a distance between chip and base material of the main welding.

11. The method according to claim 2,
wherein welding the overlapping portion includes providing a period of 0.1 to 5 seconds for a crater filling process at an end of the welding.

12. The method according to claim 11, comprising:
setting a crater current, which is a welding current at a time of the crater filling process, to 50 to 90% of a welding current of a main welding, and
providing a transition period of 0.1 to 1 second between the main welding and the crater filling process.

* * * * *